US006896124B2

(12) United States Patent
Herold

(10) Patent No.: US 6,896,124 B2
(45) Date of Patent: May 24, 2005

(54) BELT CONNECTOR AND METHOD

(75) Inventor: Wolfgang Herold, Offenbach/Main (DE)

(73) Assignee: MATO Maschinen-und Metallwarenfabrik Curt Matthaei GmbH & Co. KG, Offenbach (DE)

( * ) Notice: Subject to any disclaimer, the term of this patent is extended or adjusted under 35 U.S.C. 154(b) by 115 days.

(21) Appl. No.: 10/359,292

(22) Filed: Feb. 5, 2003

(65) Prior Publication Data
US 2003/0150698 A1 Aug. 14, 2003

(51) Int. Cl.[7] .............................................. B65G 17/00
(52) U.S. Cl. .................... 198/844.2; 24/33 P; 474/255
(58) Field of Search .......................... 198/844.2, 837; 24/33 P, 33 B, 33 C; 474/255, 256

(56) References Cited

U.S. PATENT DOCUMENTS

| 2,912,732 | A | * | 11/1959 | Stolz et al. ................. 24/33 C |
| 3,071,830 | A | * | 1/1963 | Stolz ............................ 24/33 C |
| 3,668,742 | A | * | 6/1972 | Bartmann ................... 24/33 C |
| 3,735,451 | A | * | 5/1973 | Haythornthwaite ......... 24/33 C |
| 4,315,349 | A | * | 2/1982 | Stolz ............................ 24/33 C |
| 4,344,209 | A | * | 8/1982 | Harwood ..................... 24/31 R |
| 4,364,421 | A | * | 12/1982 | Martin ................. 139/383 AA |
| 4,653,156 | A | * | 3/1987 | Stolz et al. ................. 24/33 R |
| 4,708,558 | A | * | 11/1987 | Musil .......................... 411/457 |
| 4,996,750 | A | * | 3/1991 | Musil .......................... 24/33 C |
| 5,015,220 | A | * | 5/1991 | Legge et al. ................ 474/256 |
| 5,038,442 | A | * | 8/1991 | Stolz et al. .................. 24/33 P |
| 5,048,675 | A | * | 9/1991 | Nadalutti ................. 198/844.2 |
| 5,234,101 | A | * | 8/1993 | Herold ..................... 198/844.2 |
| 5,236,079 | A | * | 8/1993 | Herold ..................... 198/844.2 |
| 5,238,169 | A | * | 8/1993 | Herold ........................ 227/147 |
| 5,341,545 | A | * | 8/1994 | Herold ........................ 24/33 P |
| 5,467,867 | A | * | 11/1995 | Musil et al. ............. 198/844.2 |
| 5,553,359 | A | * | 9/1996 | Herold ........................ 24/33 P |
| 5,620,085 | A | * | 4/1997 | Cadou et al. ............. 198/844.2 |
| 5,669,115 | A | * | 9/1997 | Sulzle .......................... 24/33 B |
| 5,848,463 | A | * | 12/1998 | Herold .......................... 29/798 |
| 5,890,266 | A | * | 4/1999 | Herold ........................ 24/33 P |
| 5,906,038 | A | * | 5/1999 | Herold ...................... 29/432.1 |
| 6,081,995 | A | * | 7/2000 | Herold .......................... 29/798 |
| 6,170,128 | B1 | * | 1/2001 | Borner et al. ............... 24/33 P |
| 6,374,462 | B1 | * | 4/2002 | Jakob .......................... 24/33 P |
| 6,627,045 | B2 | * | 9/2003 | Raczkowski et al. ....... 162/348 |
| 6,658,712 | B2 | * | 12/2003 | Herold ..................... 39/243.51 |
| 6,739,038 | B2 | * | 5/2004 | Herold .......................... 29/798 |

FOREIGN PATENT DOCUMENTS

| DE | 732524 | 2/1943 |
| DE | 1008540 | 5/1957 |
| DE | 3642803 | 6/1988 |
| DE | 29808348 | 11/1998 |
| DE | 19820204 | 11/1999 |
| DE | 19820205 | 11/1999 |
| FR | 779942 | 4/1935 |
| GB | 210116 | 1/1924 |
| JP | 10-338377 | 12/1998 |

* cited by examiner

Primary Examiner—Christopher P. Ellis
Assistant Examiner—Rashmi K Sharma
(74) Attorney, Agent, or Firm—Price, Heneveld, Cooper, Dewitt & Litton, LLP

(57) ABSTRACT

A connector for conveyor belts and the like includes a plurality of connection elements disposed in a side-by-side relationship to extend across the end edge of an associated belt. Each of the connection elements includes outwardly disposed shank portions with free ends shaped for insertion into the opposite faces of the belt, and inwardly disposed loop-shaped center portions arranged to mesh with a like connector on the opposite end of the belt. A generally flat cover element has a central aperture through which the center portions of the connection elements are inserted, and is deformable for folding the cover element over the end edge of the belt and onto the opposite faces of the belt to cover the shank portions of the connection elements on both sides of the belt.

38 Claims, 3 Drawing Sheets

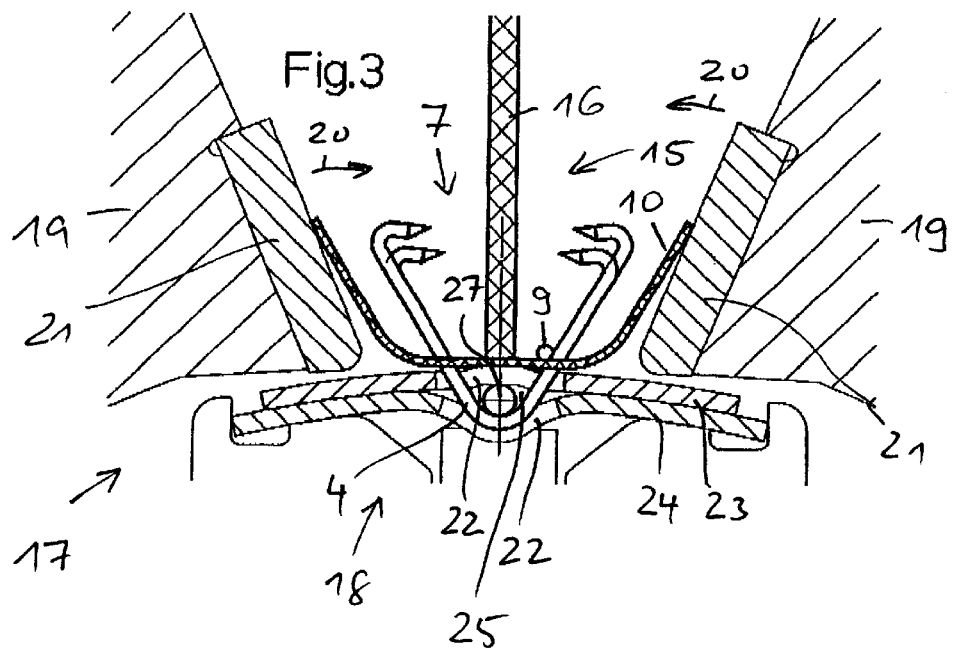
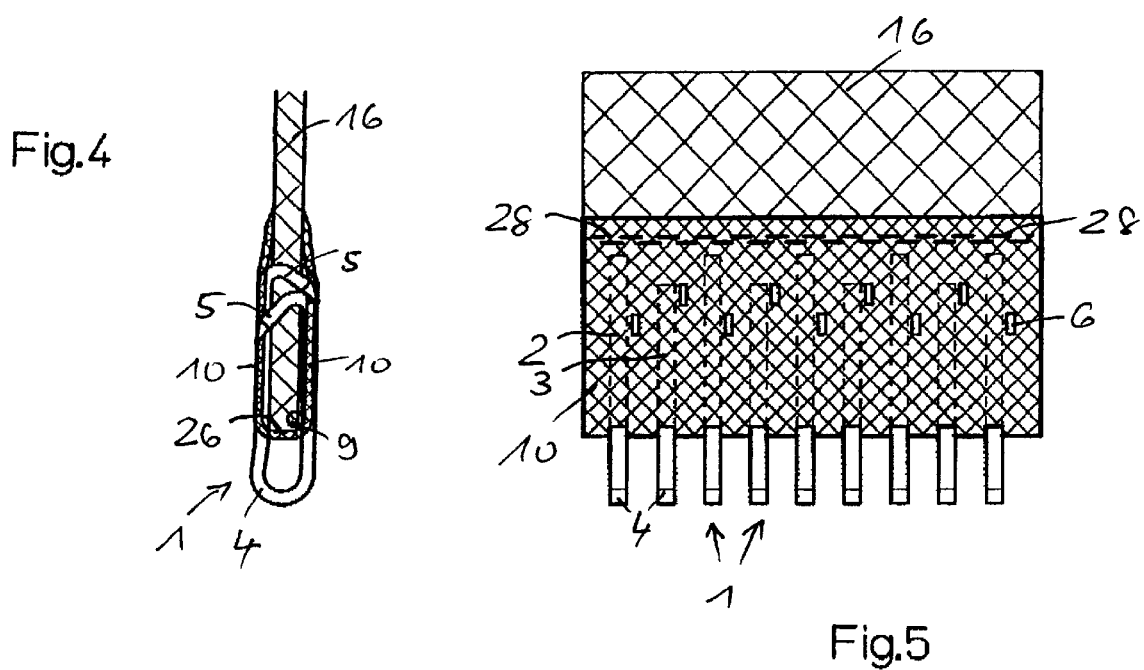

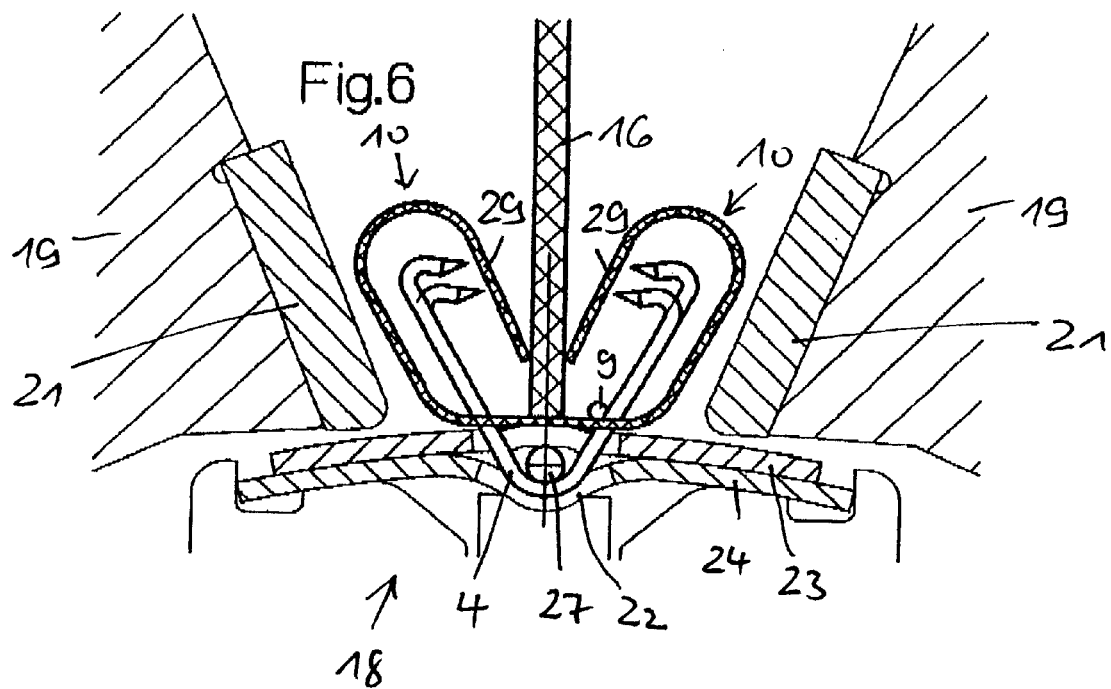
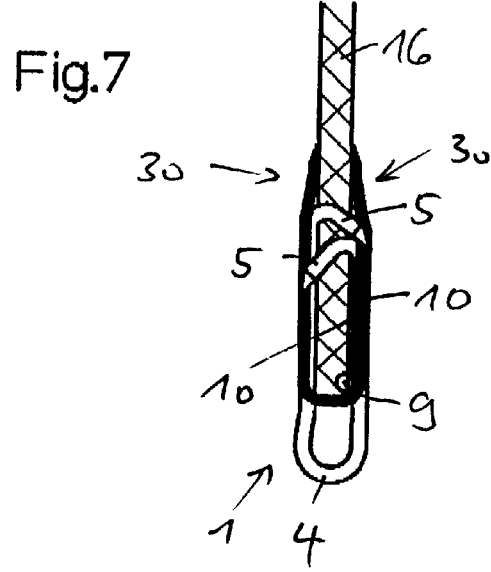

BELT CONNECTOR AND METHOD

CLAIM OF PRIORITY

Applicant hereby claims the priority benefits under the provisions of 35 U.S.C. §119, basing said claim of priority on European Patent Application Serial No. 02 003 477.3, dated Feb. 14, 2002. In accordance with the provisions of 35 U.S.C. §119 and Rule 55(b), a certified copy of the above-listed European patent application will be filed before grant of a patent.

BACKGROUND OF THE INVENTION

The present invention relates to belting, such as conveyor belts and the like, and in particular to a belt connector and method.

As disclosed in German Patent Document DE 198 20 204 A1, belt connectors or lacings are generally well known in the art, and include wire hook type fasteners which are pressed into the opposite ends of the belt, and have generally U-shaped coupling loops which mesh with the coupling loops on a similar connector on the opposite end of the belt. A coupling rod is inserted through the coupling loops in the meshed or overlapping area to create a secure, pivotal connection between the opposite ends of the belt.

Covers are used with some types of belt connectors to either protect the metal wire hooks from wear and tear, as may be caused by goods being transported on the belt, or to ensure that the goods are transported on the belt without being damaged by the wire hooks. Heretofore, such belt connectors have had a tendency to break, particularly if the belt is run in a type of dip or non-linear fashion, or must pass through a number of deflection rollers. Furthermore, damage can occur where one or more of the wire hooks break and protrude beyond the conveying surface of the belt, even when the lacing includes a reinforcing cross wire to interconnect the wire hooks with one another.

German Patent Document DE 198 20 204 A1 discloses a cover element that covers selected end portions of a conveyor belt which are interconnected with one another. In this prior art arrangement, the cover element extends over or covers the shank portions of the wire hooks on only one end surface of the belt. On the opposite end of the belt, the cover member extends under the wire hooks. Also, the cover member is positioned on only the outside or conveying side of the belt. A similar articulated belt connector is disclosed in German Patent Document DE 198 20 205 A1.

German Patent Document DE-PS 732 524 discloses a connection for drive belts or conveyor belts, wherein the belt consists of a fabric core and a rubber coating or exterior. Prior to installation of wire hook connectors into this type of belt, the rubber coating in the end area of the belt is skived away or removed, and an adhesive coating is subsequently applied onto the wire hooks. After the wire hooks have been installed, the fabric core is vulcanized in such a manner that a solid connection results between the wire hooks and the rubber coating. As a result, the belt is particularly adapted for use under wet conditions.

German Patent Document DE 36 42 803 C2 discloses a belt connector wherein the wire hooks are not interconnected by a cross wire, but rather by a paper retainer or comb. The wire hooks are pressed together, along with the paper comb into the end of the belt, and the paper is removed to form the final lacing.

German Patent Document DE 36 42 803 A1 also discloses equipping the jaws of a press with electric heating elements for pressing belt hooks onto the end of an associated belt. The heating mechanism heats at least the shanks of the wire hooks prior to being bent, and serves to partially soften or plasticize the plastic in the flat fabric belt. The belt hooks can be pressed together on the opposite sides of the belt during the bending process, such that the exterior dimension of the shanks in their final press state are no larger than the thickness of the flat fabric belt in any location.

Industrial and/or commercial laundry facilities use machines to convey laundry between the various stations, and are typically equipped with a number of fabric or plastic conveyor belts arranged in a mutually parallel, side-by-side relationship. Laundry, such as towels made from terrycloth and the like, is thus conveyed between washing, drying, ironing and folding stations.

The belts used with such industrial or commercial laundry facilitates are generally elastic in length, and may be constructed as cotton belts with elastic fibers. Heretofore, in order to keep the belt ends from fraying, they are equipped with a cover element that is positioned on the face of the respective belt, as well as the adjacent upper and lower surfaces of the belt. The cover element, constructed from fabric adhesive tape, is sewn into the end surfaces of the belt in a direction transverse to the belt length. Wire hook connectors are then fastened to the covered ends of the belt prepared in one of the manners described above. In such prior art arrangements, the above-noted disadvantages typically result, with protruding metal parts when either the wire hooks or the interconnecting cross wire break, thereby leading to threads being pulled from the laundry being transported on the conveyor belts. The laundry will therefore be damaged, or at a minimum, become unsightly.

SUMMARY OF THE INVENTION

One aspect of the present invention is a belting system for conveyors and the like, comprising a belt having a predetermined width, opposite faces, and at least one end edge. A plurality of connection elements are disposed in a generally side-by-side relationship, and extend across the width of the belt along the end edge thereof. Each of the connection elements includes outwardly disposed opposite shank portions with free ends thereof inserted into the opposite faces of the belt, and inwardly disposed loop-shaped center portions arranged to mesh with a like connector on an opposite end of the belt. A generally flat cover element includes a centrally disposed aperture through which the center portions of the connection elements are inserted, and is deformable for folding the cover element over the end edge of the belt and onto the opposite faces of the belt to cover the shank portions of the connection elements on both of the opposite faces of the belt.

Another aspect of the present invention is a method for interconnecting the opposite ends of a conveyor belt or the like of the type having a predetermined width, opposite faces, and at least one end edge. A plurality of connection elements are arranged in a generally side-by-side relationship, and have sufficient length to extend across the width of the belt along the end edge thereof. Each of the connection elements includes outwardly disposed opposite shank portions with free ends thereof shaped for insertion into the opposite faces of the belt, and inwardly disposed loop-shaped center portions arranged to mesh with a like connector on an opposite end of the belt. The method also includes providing a generally flat, deformable cover element having a centrally disposed aperture shaped to receive the center portions of the connection elements therethrough. The center portions of the connection elements are inserted through the aperture in the cover elements, and the end edge of the belt is then inserted between the shank portions of the connection elements to a position wherein the end edge abuts an interior side of the cover element. The free ends of the connection elements are then pressed into the side faces of the conveyor belt, and the cover element is folded over the end edge of the belt and onto the opposite faces of the belt to cover the shank portions of the connection elements on both faces of the belt.

Yet another aspect of the present invention is a connector for conveyor belts and the like of the type having a predetermined width, opposite faces and at least one end edge. A plurality of connection elements are disposed in a generally side-by-side relationship to extend across the width of the belt along the end edge thereof. Each of the connection elements includes outwardly disposed opposite shank portions with free ends shaped for insertion into the opposite faces of the belt, and inwardly disposed loop-shaped center portions arranged to mesh with a like connector on the opposite end of the belt. A generally flat cover element is provided with a centrally disposed aperture through which the center portions of the connection elements are inserted, and is deformable for folding the cover element over the end edge of the belt and onto the opposite faces of the belt to cover the shank portions of the connection elements on both sides of the belt.

Yet another aspect of the present invention is to provide a wire hook type of belt connector designed so that the wire hooks cannot adversely impact or damage the goods to be conveyed on the belt. Furthermore, the belt connector is designed so that the goods being conveyed on the belt do not damage or otherwise negatively impact the wire hook connector. The present invention makes it possible to install wire hooks and a related cover element at the opposite ends of a belt in a simple, uncomplicated manner. Preferably, the cover element is located on both sides of the belt, starting with the face of the belt, and covering the shanks of the wire hooks. It is important that the cover element covers the shanks of the wire hooks, and does not have the shanks of the wire hooks on top of the cover element. In this manner, the goods to be conveyed on the belt do not make contact with the shanks of the wire hooks, but only with the cover element.

Preferably, the cover element does not only cover the area of the shanks of the wire hooks facing the goods to be conveyed, but also the shanks of the wire hooks facing away from the support side of the belt. Also, the cover element preferably covers the end edge and opposite faces of the belt.

The cover element leaves open or exposed the coupling loop portions of the wire hooks, so as to permit a coupling rod to be inserted through synchronized or meshed coupling loops to pivotally interconnect the opposite ends of the belt. In the present design, when one or more of the wire hooks breaks, or the cross wire which interconnects the wire hooks breaks, there is no adverse consequence or damage to the goods being conveyed on the belt. The metal ends of the broken hooks and/or connector wire do not penetrate the cover element, so that the goods, such as terrycloth towels, laundry or the like, contact only the cover element.

The present invention is particularly well adapted for fabric or textile conveyor belts of the type used in commercial laundry facilities, especially cotton conveyor belts. The connector being located in the face area of the belt ensures that the belt will not fray during operation. Furthermore, the cover element covering the shanks of the wire hooks and the face of the belt, permits the U-shaped or loop-shaped portions of the wire hooks to protrude, and provide additional support to the lacing. In one aspect of the present invention, the flat cover element is attached to the belt by means of adhesion or gluing. More specifically, the cover element may be provided with a layer of adhesive, preferably a layer of hot glue or elastic glue. When installing the cover element, the same makes contact with the face of the belt and the surfaces of the shank portions of the wire hooks facing away from the belt, and also with the belt area adjacent to the wire hooks, assuming the cover element is adequate in length.

Furthermore, the cover element may also be sewn into the belt at the front ends of the cover element located vertically to the direction of conveyance of the belt. This will provide increased security to prevent the cover element from becoming detached from the belt. The cover element is preferably designed as a fabric tape. It is also conceivable to design the cover element as a formed plastic component. In either case, the cover element can be fastened to the wire hooks via a hot gluing process, or also without glue, if the cover element is shaped as a formed component made from thermoplastic synthetics.

The connection between the cover element and the wire hooks can be further improved by bending or folding the cover element back in the area of the ends of the wire hooks between the shanks of the wire hooks and the belt. These end areas of the cover element are thereby also pressed in with the wire hooks when they are installed in the end of the belt.

The security of the connection between the wire hooks and the cover element can be further increased if the wire hooks connected with the end of the belt engage or penetrate the cover element with their hook endings. The wire hooks therefore go through the covering, and the hook endings protrude through the cover element into the belt.

For wire hook connectors having an interconnecting cross wire located in the transition area from the coupling loops to the shanks of the wire hooks, it is considered advantageous that the cover element makes contact with the cross wire on the side facing the coupling loops. In the event the cross wire breaks, for instance when guiding the belt through a dip or a number of deflection rollers, the cover element securely covers the cross wire, such that any broken ends of the cross wire are not exposed to the goods being supported on the conveyor belt.

In one aspect of the present invention, the cover element is equipped with parallel slots, which receive therethrough the loop portions of the wire hooks. This cover element design makes it possible to cover the connections simply, and in only the shank area of the wire hooks and the face portions of the belt. The coupling loops remain fully exposed and undisturbed by the cover element.

The present invention also contemplates the installation of wire hooks at the end of the belt, and the mounting of the cover element in a single step or process, wherein the loop portions of the wire hooks are inserted through the slots in the cover element, and the shank portions of the wire hooks, along with the opposite sides of the cover element, are simultaneously pressed into the belt.

The cover element is preferably equipped with slots through which the coupling loops can pass prior to mounting the wire hooks at the end of the belt. The cover element can be pre-positioned in the connector hooks prior to pressing the wire hooks into the belt by inserting the loop portions of the wire hooks into the cover element slots, such that the coupling loops are positioned on one side, and the shanks are positioned on the other side of the cover element. As a result of this design, and due to the location of the cover element relative to the configuration of hooks, fastening the wire hooks at the end of the belt and positioning the cover element in a press can be done in an especially simple manner.

In one process, press jaws, which can move toward and away from each other, retain the hooks between them in an open position. The end of the belt is placed between the open hooks, as well as the end section of the cover element located between the hook shanks and the press jaws.

Preferably, the cover element is glued to the hook shanks and/or opposite belt faces, specifically under heat impact, as it is being fastened to the shanks of the hooks. This can be done in a simple manner by using heated press jaws which make contact with the cover element. Instead of providing heat via contact with hot press beams, the cover element may also be heated with hot air. It is further conceivable to heat the cover element at a different location, and promptly feed it to the press station. The advantage of this is that gluing the cover element with the help of a press beam or such is eliminated.

In order to produce a more permanent connection with the cover element, the cover element may be connected with not only the shank portions of the wire hooks, but also with the face surfaces of the ends of the belt facing away from the coupling loops. A glue connection, specifically a glue connection by heat impact, is considered a preferred type of connection.

The invention therefore suggests a specifically designed belt connector with a specifically positioned cover element which not only protects essential areas of the wire hooks, but also protects the goods being transported on the belt, and also adds traction from the cover element. This is the case when force from the cover element is conducted into the cross wire connecting the wire hooks. The cover elements protect against frayed fabric, especially with textile or fabric conveyor belts.

Due to the fact that the cover element encompasses or envelops the entire exterior of the wire hooks, the contact area facing the goods to be conveyed is largely level in the end area of the belt, and contributes to keeping the belt straight and flat, thus counteracting twisting due to asymmetrical transmission of force within the belt.

These and other advantages of the invention will be further understood and appreciated by those skilled in the art by reference to the following written specification, claims and appended drawings.

BRIEF DESCRIPTION OF THE DRAWINGS

FIG. 3 is a side view of the belt connector shown installed in a press, before the connector is inserted into an associated end of a belt.

FIG. 4 is a side view of the belt connector shown mounted on the end of the belt.

FIG. 5 is a top plan view of the belt connector shown in FIG. 4, mounted on the end of the belt.

FIG. 6 is a side elevational view of another embodiment of the present invention, wherein the cover element is folded back under the free ends of the wire hooks.

FIG. 7 is a side view of the belt connector shown in FIG. 6, installed on the end of an associated belt.

DETAILED DESCRIPTION OF THE PREFERRED EMBODIMENTS

Figure 1:
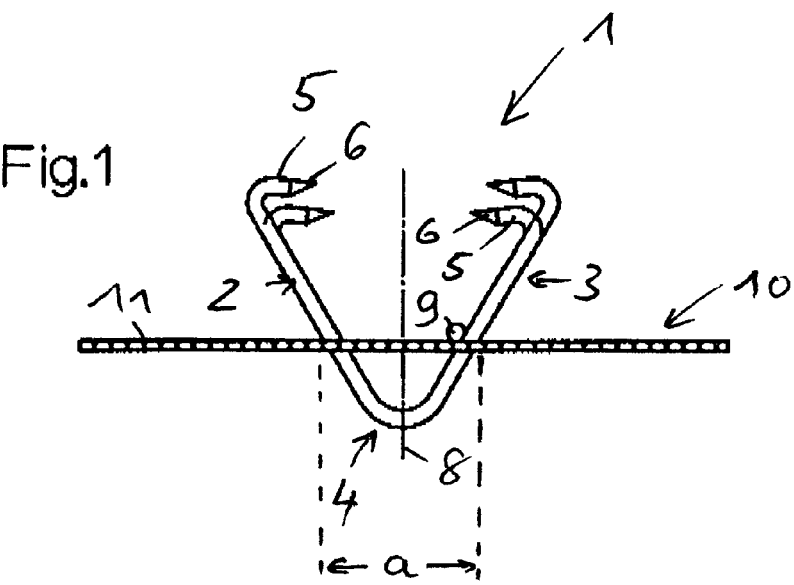
FIG. 1 is a side view of a belt connector embodying the present invention, having wire hooks interconnected by a cross wire, wherein loop portions of the wire hooks are inserted through a cover element.
Figure 2:
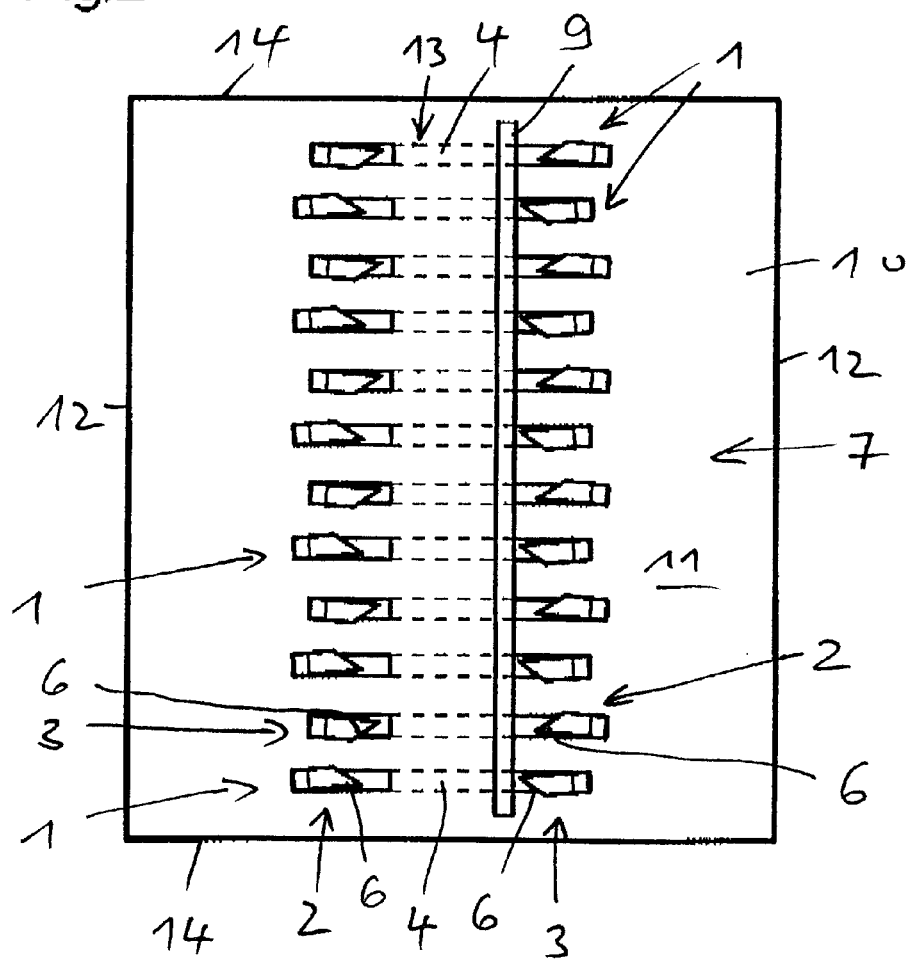
FIG. 2 is a top plan view of the belt connector shown in FIG. 1.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the illustrated example, connection element 1 is in the nature of a wire hook, which has a long shank 2, and a short shank 3, as well as a coupling loop 4 which connects shanks 2 and 3 with each other. Shanks 2 and 3 are substantially coplanar, with inwardly protruding free ends or tips 6 that point toward one another. In the illustrated example, twelve wire hooks 1 are arranged in a generally side-by-side fashion and form a hook assembly 7. As shown in FIG. 1, referring to central axis 8, each adjacent wire hook 1 is arranged in an alternating 180 degree position, so that tips 6 are staggered. In other words, with reference to the orientation shown in FIG. 1, the first wire hook 1 has long shank 2 located on the left, and short shank 3 located on the right, whereas the next adjacent hook 1 has long shank 2 located on the right, and short shank 3 located on the left, and so on. The tips 6 of each of the wire hooks 1 point in an opposite direction. The orientation of the tips 6 of adjacent wire hooks 1 is in the opposite direction relative to each immediately adjacent shank 2, 3, respectively. Referring again to FIG. 1, the shanks 2, 3 on the right-hand side of hook assembly 7 are interconnected and held together by means of a cross wire 9 disposed in the transition area of coupling loop 4. Wire hooks 1 are therefore positively positioned in a preselected side-by-side relationship by cross wire 9. Hook assembly 7 is inserted into a flat cover element 10. Cover element 10 has a rectangular main surface 11, whereby the cross wire 9 of hook assembly 7 is positioned parallel to the longitudinal edges 12 of cover element 10. Cover element 10 is positioned symmetrically along centerline 8 of hook assembly 7.

In the illustrated example, cover element 10 is equipped with slots 13, and more specifically twelve slots 13, whereby each slot is used to hold one of the wire hooks 1 in the area of coupling loops 4. Accordingly, slots 13 are positioned parallel to narrow edges 14 of cover element 10.

In one example of the present invention, cover element 10 is constructed from a fabric tape having a layer of hot glue on its interior side 11, facing cross wire 9. The slots 13 in cover element 10 may be made by punching them out with a molding tool, or other similar forming techniques. The length of each slot 13 in cover element 10 is designated by the reference letter "a" in FIG. 1.

FIGS. 1 and 2 illustrate the connection of hook assembly 7 with cover element 10 and end section 15 of belt 16. The illustrated belt 16 is of the type used in commercial laundry facilitates, and is elastic in length, and may be made from a fabric, such as cotton made from elastic fibers or the like. Belt 16 has the width of five centimeters (1.95 inches) for instance, but may be made either considerably larger or smaller in width as well. The illustrated belt 16 is specifically adapted for use with industrial laundry machines, wherein a number of belts are arranged next to one another in order to convey laundry, such as terrycloth towels or the like, between washing, drying, ironing and folding stations.

A press device 17 (FIG. 3) is provided for installing hook assembly 7 and cover element 10 on belt 16 in the manner illustrated in FIG. 3.

Press device 17 has a stationary storage device or retainer 18 to hold or retain hook assembly 7, as well as two press jaws 19, which are movable or adjustable toward and away from one another in the direction of arrows 20 by conventional means (not shown), such as hydraulic, pneumatic or electric motors, or manual activation. In FIG. 3, the jaws 19 of press device 17 are shown in an open or diverged condition.

Heating plates 21 are integrated into press jaws 19 in the contact area with cover element 10 and hook assembly 7. Conventional equipment for heating the heating plates is not illustrated. The pressing process of hook assembly 7 is accomplished by means of metal heating plates 21, and therefore the connection of hook assembly 7 with belt 16 in the area of its end section 15 is achieved while simultaneously installing or attaching cover element 10 to the shanks 2 and 3 of wire hooks 1, as well as to the opposite faces of belt 16 adjacent to the tip portions 6 of wire hooks 1.

FIG. 3 shows that in the area of coupling loops 4, wire hooks 1 on hook assembly 7 are inserted into slots 22 of two plates 23 and 24 of storage device or retainer 18. A mounting rod 27 is slid into slit 25, created between plates 23 and 24, and holds hook assembly 7 in place after insertion into storage device or retainer 18. Cover element 10, which was previously placed onto hook assembly 7, is flexible or deformable, and is shown being folded or bent upwardly between heating plates 21 and the shanks 2, 3 of wire hooks 1, as shown in FIG. 3.

When press jaws 19 and heating plates 21 are converged, or move toward each other in a pivotal type of motion, heating plates 21 push cover element 10 together with shanks 2 and 3 of wire hooks 1 in the direction of belt 16, whereby the tips 6 of wire hooks 1 penetrate belt 16. In the illustrated example, cover element 10 covers the shanks 2 and 3 of wire hooks 1, as well as the adjoining end portions of belt 16, as illustrated in FIGS. 4 and 5. As cover element 10 is heated, it is adhered or glued to belt 16 in the area of the face surface or end edge 26 of belt 16, as well as shanks 2 and 3 of wire hooks 1 and the opposite faces at the end area of belt 16. In the illustrated example, cover element 10 is shaped and sized to completely envelop or cover all portions of hook assembly 1, except coupling loop 4.

The security of the connection of cover element 10 to belt 16 can be improved and/or optimized if cover element 10 is also sewn to belt 16 by means of a cross seam 28 in the location illustrated in FIG. 5.

The embodiment of the present invention illustrated in FIGS. 6 and 7 is different from the embodiment illustrated in FIGS. 3–5 insofar as the cover element 10 is wider than the one shown in FIGS. 3–5. Consequently, cover element 10 can be folded or bent back at its end section 29 between belt 16 and the shank 2, 3 respectively of wire hooks 1. In the illustrated example, it was chosen to fold in end section 29, so that after the pressing process, the two folded sections 70 of cover element 10 are positioned adjacent to belt 16. It is sufficient that in this attachment of cover element 10 a layer of adhesive or glue is placed only on that portion of cover element 10 facing shanks 2 and 3 of wire hooks 1. During the pressing process, the adhesive contacts or penetrates the fabric of cover element 10 in such a manner that the folded in end section 29 of cover element 10 also forms a firmly glued unit with the shanks 2 and 3 of wire hooks 1, along with belt 16. However, it is also possible to apply a layer of glue to those areas where folded in end section 29 of cover element 10 may make contact with belt 16, therefore on the other surface of cover element 10. This arrangement is advantageous, particularly if cover element 10 is not suited to allow the adhesive to penetrate the same.

In the two embodiments shown, the lengths of hook sections 5 of wire hooks 1 are sized relative to the thickness of belt 16, such that the tips 6 of hook sections 5 engage cover element 10 at wire hooks 1 when connected with belt 16, but do not protrude from the belt.

In operation, after the loop portions of the hooks 1 are inserted through the slots 13 in cover element 10, the end edge of the belt is inserted between the shanks 2 and 3 of wire hooks 1 to a position wherein the end edge 26 of the belt 16 abuts an interior side of the cover element 10. The pressing of the tips 6 of wire hooks 1 into the opposite faces of belt 16 and the folding of cover element 10 against the opposite faces of the belt 16 is preferably performed substantially simultaneously by the closing of jaws 19.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A belting system for conveyors and the like, comprising:

a conveyor belt having a predetermined width, opposite faces, and at least one end edge;

a plurality of connection elements disposed in a generally side-by-side relationship and extending across the width of said belt along said end edge thereof; each of said connection elements including outwardly disposed opposite shank portions with free ends thereof inserted into said opposite faces of said belt, and inwardly disposed loop-shaped center portions arranged to mesh with a like connector on an opposite end of said belt; and a generally flat cover element having a centrally disposed aperture through which said center portions of said connection elements are received, and being deformable for folding said cover element over said end edge of said belt and onto said opposite faces of said belt to cover said shank portions of said connection elements on both of said opposite faces of said belt.

2. A belting system as set forth in claim 1, wherein: said connection elements comprise wire hooks.

3. A belting system as set forth in claim 2, including: a rigid bar extending across said connection elements and being connected therewith to positively retain said connection elements in said side-by-side relationship.

4. A belting system as set forth in claim 3, wherein: said belt is elastic along its length.

5. A belting system as set forth in claim 4, wherein: said belt comprises a cotton belt with elastic fibers.

6. A belting system as set forth in claim 5, wherein: said cover element comprises a fabric tape.

7. A belting system as set forth in claim 6, wherein: said cover element includes adhesive disposed on an interior side thereof to connect the same with said end edge and said opposite faces of said belt, as well as said shank portions of said connection elements.

8. A belting system as set forth in claim 7, wherein: said free ends of said connection elements penetrate said cover element.

9. A belting system as set forth in claim 8, wherein: said cover element aperture comprises parallel slots configured to receive therethrough said center portions of said connection elements.

10. A belting system as set forth in claim 9, wherein: said cover element abuts said bar on a side thereof facing said center portions of said connecting elements.

11. A belting system as set forth in claim 1, wherein: said belt is constructed from a synthetic resin material.

12. A belting system as set forth in claim 1, wherein: said belt is constructed from polyurethane.

13. A belting system as set forth in claim 1, wherein: said cover element is constructed from formed plastic.

14. A belting system as set forth in claim 7, wherein: said adhesive comprises hot glue.

15. A belting system as set forth in claim 7, wherein: said adhesive comprises an elastic adhesive.

16. A belting system as set forth in claim 1, including: a rigid bar extending across said connection elements and being connected therewith to positively retain said connection elements in said side-by-side relationship.

17. A belting system as set forth in claim 16, wherein: said cover element abuts said bar on a side thereof facing said center portions of said connecting elements.

18. A belting system as set forth in claim 1, wherein: said belt is elastic along its length.

19. A belting system as set forth in claim 1, wherein: said belt comprises a cotton belt with elastic fibers.

20. A belting system as set forth in claim 1, wherein: said cover element comprises a fabric tape.

21. A belting system as set forth in claim 1, wherein: said cover element includes adhesive disposed on an interior side thereof to connect the same with said end edge and said opposite faces of said belt, as well as said shank portions of said connection elements.

22. A belting system as set forth in claim 21, wherein: said adhesive comprises hot glue.

23. A belting system as set forth in claim 1, wherein: said free ends of said connection elements penetrate said cover element.

24. A belting system as set forth in claim 1, wherein: said cover element aperture comprises parallel slots configured to receive therethrough said center portions of said connection elements.

25. In a method for interconnecting opposite ends of a conveyor belt or the like of the type having a predetermined width, opposite faces, and at least one end edge, the improvement comprising:

providing a plurality of connection elements disposed in a generally side-by-side relationship of sufficient length to extend across the width of the belt along the end edge thereof; each of the connection elements including outwardly disposed opposite shank portions with free ends thereof shaped for insertion into the opposite faces of the belt, and inwardly disposed loop-shaped center portions arranged to mesh with a like connector on an opposite end of the belt;

providing a generally flat, deformable cover element having a centrally disposed aperture shaped to receive the center portions of the connection elements therethrough;

inserting the center portions of the connection elements through the aperture in the cover element;

inserting the end edge of the belt between the shank portions of the connection elements to a position wherein the end edge abuts an interior side of the cover element;

pressing the free ends of the connection elements into the side faces of the conveyor belt; and folding the cover element over the end edge of the belt and onto the opposite faces of the belt to cover the shank portions of the connection elements on both faces of the belt.

26. A method as set forth in claim 25, wherein: said connection elements pressing step and said cover element folding step are performed substantially simultaneously by clamping the connection elements and the cover element against the opposite faces of the belt.

27. A method as set forth in claim 25, wherein:

forming in the cover element a plurality of mutually parallel slots disposed in a generally side-by-side relationship, and inserting the center portions of each of the connection elements through the slots to a position wherein the cover member abuts the end edge of the belt.

28. A method as set forth in claim 27, wherein:

said clamping step comprises positioning the connection elements, cover element, and belt end between opposition jaws of a press which can be moved towards each other.

29. A method as set forth in claim 28, including:

adhering the cover element to the shanks of the connection elements during said pressing step.

30. A method as set forth in claim 29, including:

adhering the cover element to the opposite faces of the belt.

31. A method as set forth in claim 30, wherein:

said adhering steps include applying a heat activated adhesive to an interior side of the cover element prior to said pressing step, and heating the cover element during said pressing step to securely adhere the interior side of the cover element to the shanks of the connection elements and the opposite faces of the belt.

32. A method as set forth in claim 31, wherein:

said inserting step includes positioning the cover element such that its ends face away from the center portions of the connection elements between the belt and the shanks of the connection elements.

33. A method as set forth in claim 32, including:

sewing the cover element to the belt in the area of its ends facing away from the center portions of the connection elements.

34. A connector for conveyor belts and the like of the type having a predetermined width, opposite faces, and at least one end edge, comprising:

a plurality of connection elements disposed in a generally side-by-side relationship to extend across the width of the belt along the end edge thereof; each of said connection elements including outwardly disposed opposite shank portions with free ends thereof shaped for insertion into the opposite faces of the belt, and inwardly disposed loop-shaped center portions arranged to mesh with a like connector on an opposite end of the belt; and a generally flat cover element having a centrally disposed aperture through which said center portions of said connection elements are received, and being deformable for folding said cover element over the end edge of the belt and onto the opposite faces of the belt to cover said shank portions of said connection elements on both faces of the belt.

35. A connector as set forth in claim 34, wherein:

said cover element aperture comprises a plurality of mutually parallel slots disposed in a generally side-by-side relationship, and configured to receive said center portions of each of said connection elements therethrough to a position wherein said cover member abuts the end edge of the belt.

36. A connector as set forth in claim 35, wherein:

said cover element includes an interior side with adhesive to connect said cover sheet with the opposite faces of the belt and said shank portions of said connection elements.

37. A connector as set forth in claim 36, wherein:

said cover element completely envelops said shank portions of said connection elements to protect both said connection elements and articles carried on the belt.

38. A connector as set forth in claim 37, wherein:

said cover element extends around and under said free ends of said connection elements, such that said free ends penetrate said cover element and securely retain the same on the belt.

* * * * *